(12) United States Patent
Dillinger et al.

(10) Patent No.: US 10,201,919 B2
(45) Date of Patent: Feb. 12, 2019

(54) HEAD REST

(71) Applicant: Adient Luxembourg Holding S.à.r.l., Luxembourg (LU)

(72) Inventors: Thomas Dillinger, Ratingen (DE); Felix Manduzio, Illkirch-Graffenstaden (FR)

(73) Assignee: Adient Luxembourg Holding S.à.r.l., Luxembourg (LU)

( * ) Notice: Subject to any disclaimer, the term of this patent is extended or adjusted under 35 U.S.C. 154(b) by 0 days.

(21) Appl. No.: 15/543,706

(22) PCT Filed: Jan. 15, 2016

(86) PCT No.: PCT/EP2016/050834
§ 371 (c)(1),
(2) Date: Jul. 14, 2017

(87) PCT Pub. No.: WO2016/113419
PCT Pub. Date: Jul. 21, 2016

(65) Prior Publication Data
US 2018/0009139 A1 Jan. 11, 2018

(30) Foreign Application Priority Data
Jan. 15, 2015 (DE) .................. 10 2015 200 553

(51) Int. Cl.
*B60N 2/80* (2018.01)
*B29C 44/12* (2006.01)
*B60N 2/58* (2006.01)
*B60N 2/70* (2006.01)
*B29C 44/18* (2006.01)
*B29L 31/30* (2006.01)
(Continued)

(52) U.S. Cl.
CPC .......... *B29C 44/1271* (2013.01); *B29C 44/18* (2013.01); *B60N 2/5825* (2013.01); *B60N 2/7017* (2013.01); *B60N 2/80* (2018.02); *B29C 44/08* (2013.01); *B29K 2075/00* (2013.01); *B29L 2031/3023* (2013.01)

(58) Field of Classification Search
CPC ...... B60N 2/5825; B60N 2/48; B60N 2/7017; B29C 44/1271; B29C 44/18; B29C 44/08
USPC ................................................ 297/391–410
See application file for complete search history.

(56) References Cited

U.S. PATENT DOCUMENTS 4,191,422 A * 3/1980 Inasawa .................. B60N 2/865
297/391
5,257,853 A * 11/1993 Elton ..................... B60N 2/868
297/391
(Continued)

FOREIGN PATENT DOCUMENTS

CN 101898526 A 12/2010
CN 102123635 A 7/2011
(Continued)

*Primary Examiner* — Rodney B White
(74) *Attorney, Agent, or Firm* — McGlew and Tuttle, P.C.

(57) ABSTRACT

A headrest (400) is provided for a vehicle. The head rest (400) includes a front part (200) and a back part (100) with integrated lateral parts (104). The front part (200) and the back part (100) with integrated lateral parts (104) are formed in a complementary manner such that when they are assembled together, a closed space is formed in which a U-shaped curved support rod (300) can be inserted.

8 Claims, 4 Drawing Sheets

(51) Int. Cl.
*B29K 75/00* (2006.01)
*B29C 44/08* (2006.01)

(56) References Cited

U.S. PATENT DOCUMENTS

| | | | | |
|---|---|---|---|---|
| 5,664,840 | A * | 9/1997 | Stenzel | B60N 2/5841 297/391 |
| 6,183,045 | B1 * | 2/2001 | Marfilius | B60N 2/803 297/391 |
| 6,910,740 | B2 * | 6/2005 | Baker | B60N 2/844 297/408 |
| 7,237,842 | B2 * | 7/2007 | Schmuda von Trzebiatowski | B60N 2/885 297/391 |
| 8,414,078 | B2 * | 4/2013 | Fujita | B60N 2/85 297/391 |
| 2006/0001307 | A1 * | 1/2006 | Embach | B60R 7/043 297/391 |
| 2006/0131947 | A1 * | 6/2006 | List | B60N 2/885 297/391 |
| 2007/0257537 | A1 * | 11/2007 | Asbury | A47C 7/38 297/391 |
| 2010/0140987 | A1 * | 6/2010 | Alexander | B60N 2/888 297/391 X |
| 2010/0270841 | A1 * | 10/2010 | Sobieski | B60N 2/865 297/391 |
| 2010/0301654 | A1 * | 12/2010 | Sobieski | B60N 2/865 297/391 |
| 2011/0109143 | A1 * | 5/2011 | Maddelein | B60N 2/865 297/404 |
| 2012/0080922 | A1 * | 4/2012 | Fey | B60N 2/4814 297/391 |
| 2012/0080926 | A1 * | 4/2012 | Fey | B60N 2/4864 297/410 |
| 2012/0098316 | A1 * | 4/2012 | Matsushima | B60N 2/818 297/391 |
| 2013/0106162 | A1 * | 5/2013 | Raja K | B60N 2/4855 297/391 |
| 2013/0234491 | A1 * | 9/2013 | Schmitz | B60N 2/888 297/391 |
| 2013/0320738 | A1 * | 12/2013 | Li | B60N 2/80 297/391 |
| 2013/0341987 | A1 * | 12/2013 | Humer | B60N 2/859 297/391 |
| 2014/0028071 | A1 * | 1/2014 | Gunther | B60N 2/4864 297/391 |
| 2014/0167476 | A1 * | 6/2014 | Wang | B60N 2/4844 297/391 |
| 2014/0183921 | A1 * | 7/2014 | Hage-Hassan | B60N 2/80 297/378.1 |
| 2016/0167551 | A1 * | 6/2016 | Okamoto | B60N 2/80 297/391 |

FOREIGN PATENT DOCUMENTS

| | | |
|---|---|---|
| CN | 104024043 A | 9/2014 |
| DE | 10 2009 046 660 A1 | 5/2011 |
| DE | 10 2011 077 840 A1 | 12/2012 |
| EP | 0 210 587 A2 | 2/1987 |
| EP | 1 166 991 A2 | 1/2002 |
| EP | 1 842 648 A2 | 10/2007 |
| FR | 3 003 211 A1 | 9/2014 |
| JP | H09 66762 A | 3/1997 |
| WO | 9944859 A1 | 9/1999 |
| WO | 2013186310 A1 | 12/2013 |

\* cited by examiner

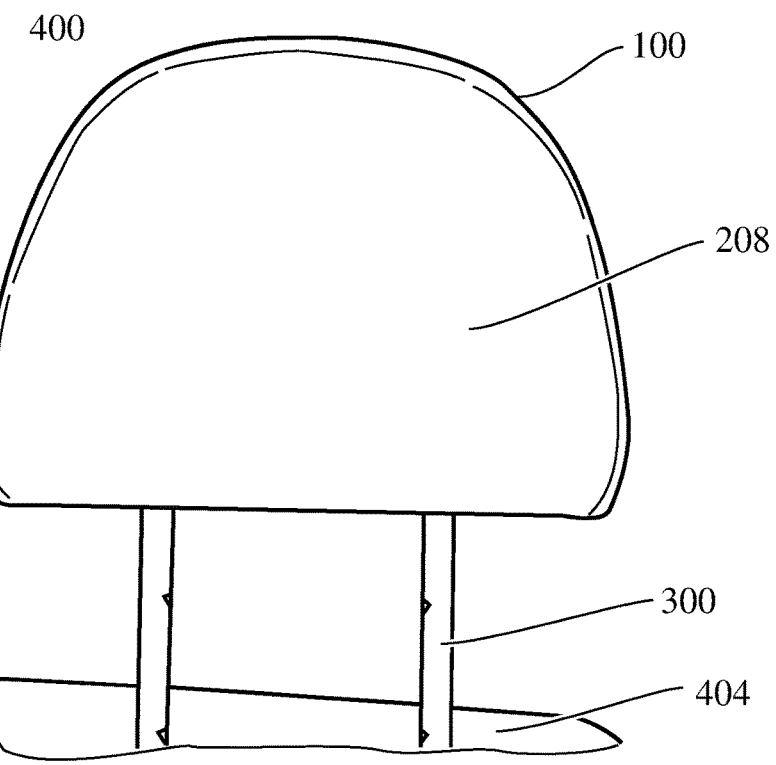
Fig. 7
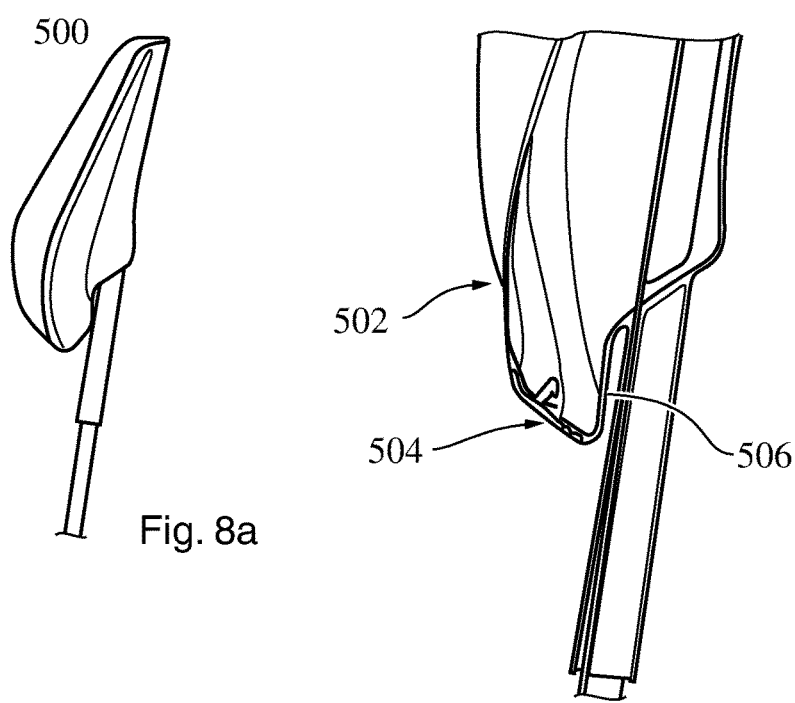
Fig. 8a
Fig. 8b

HEAD REST

CROSS REFERENCE TO RELATED APPLICATIONS

This application is a United States National Phase Application of International Application PCT/EP2016/050834, filed Jan. 15, 2016, and claims the benefit of priority under 35 U.S.C. § 119 of German Application 10 2015 200 553.4, filed Jan. 15, 2015, the entire contents of which are incorporated herein by reference.

FIELD OF THE INVENTION

The present invention relates to a head rest for a vehicle.

BACKGROUND OF THE INVENTION

No head rest is known in the prior art which can be produced with the application of a pour-in-place technique and with simultaneous fastening to a supporting rod for fastening to a back rest of a vehicle seat within one method step, the production costs at the same time being lowered and safety standards being maintained.

SUMMARY OF THE INVENTION

It is an object of the present invention to provide a head rest for a vehicle, which head rest can be produced with the application of a pour-in-place technique and with simultaneous fastening to a supporting rod for fastening to a back rest of a vehicle seat within one method step, the production costs at the same time being lowered and safety standards being maintained.

The object of the present invention is achieved by way of a head rest, the head rest comprising a front part and a rear part with integrated side parts, the front part and the rear part with integrated side parts being shaped in a complementary manner such that, after assembly, they together form a closed space, into which a supporting rod which is curved in a U-shape can be received.

Here, the head rest according to the invention has the advantage in comparison with the prior art that process steps can be saved during the production, with the result that the production costs can be lowered, maintenance of safety standards not being dispensed with.

It is provided in a further embodiment that the rear part with the integrated side parts has laterally inwardly inclined edges, onto which hooks are attached which are configured to enter into a first plug-like connection with first punched portions which are made on the lateral edges of the front part, the inwardly inclined edges of the rear part with the integrated side parts enclosing the lateral edges of the front part in a positively locking manner, a part of the hooks being configured, furthermore, to enter into a second plug-like connection with second punched portions in the supporting rod which is curved in a U-shape.

This has the advantage that the head rest according to the invention can be "plugged together" by way of simple pressing together of the front and rear part, the plug-in connections which are formed ensuring firm cohesion of the two-piece head rest.

It is provided in a further embodiment that the front part comprises a tailored trim part which comprises a cover.

This has the advantage that merely the front part has to be tailored during the production. A tailored cover part need merely be fastened to the front side of the front part by means of the hooks, without seams being required.

It is provided in a further embodiment that the rear part with the integrated side parts is an injection molded part, the injection molded part comprising a plastic.

This has the advantage that the rear side and the sides of the head rest can be produced by means of injection molding processes as a contiguous or single-piece structural part and with the use of any desired plastically deformable plastics.

In a further embodiment, along its respective axis, each of the hooks has a tapering tip which is configured to be received by the first and second punched portions.

This advantageously achieves a situation where the hooks of the rear part are anchored fixedly in the punched portions of the front part and in the punched portions of the supporting rod in an immediate and irreversible manner by way of merely being pressed together.

In a further embodiment, a foam can be filled into the closed space, the foam being a hard foam and/or a soft foam.

By way of an introduction of foams, such as polyurethane, the interior space of the head rest can advantageously be filled and, as a result, can impart shape retention and stability to the head rest, which is essential for maintaining the safety standards.

In a further embodiment, the supporting rod which is curved in a U-shape is arranged in the closed space between the front part and the rear part with the integrated side parts in such a way that the shortest rod section of the supporting rod which is curved in a U-shape runs largely parallel to the upper edge of the rear part with the integrated side parts and to the upper edge of the front part.

As a result, the processes of the assembly of the head rest and the process of the attachment of the head rest to a supporting rod for mounting on the back rest of a vehicle seat can advantageously be combined into a single process.

In a further embodiment, the invention relates to a method for producing a head rest, a front part, a rear part with integrated side parts, and a supporting rod which is curved in a U-shape being assembled together within the context of a pour-in-place process in one method step, by means of hooks which are positioned on inwardly inclined edges of the rear part with the integrated side parts, the front part and the rear part with the integrated side parts being joined together in an integrally joined manner, a closed space being produced, in which the supporting rod which is curved in a U-shape is positioned and is fastened to the upper edge of the rear part by means of a part of the hooks, a foam being injected into the closed space through an injection hole, the rear part being an injection molded part which comprises a plastic, an identical funnel being used for the production of the injection molded part and for the injection of the foam.

Further details, features and advantages of the invention result from the drawings, and from the following description of preferred embodiments using the drawings. Here, the drawings illustrate merely exemplary embodiments of the invention which do not restrict the essential concept of the invention. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 7 is a plan view showing the front side of the head rest front part, in the assembled state;

FIG. 8a shows an outer view from the side of a further embodiment of the head rest according to the invention; and FIG. 8b shows an enlarged outer and inner view from the side of said embodiment of the head rest according to the invention.

DESCRIPTION OF THE PREFERRED EMBODIMENTS

Figure 1:
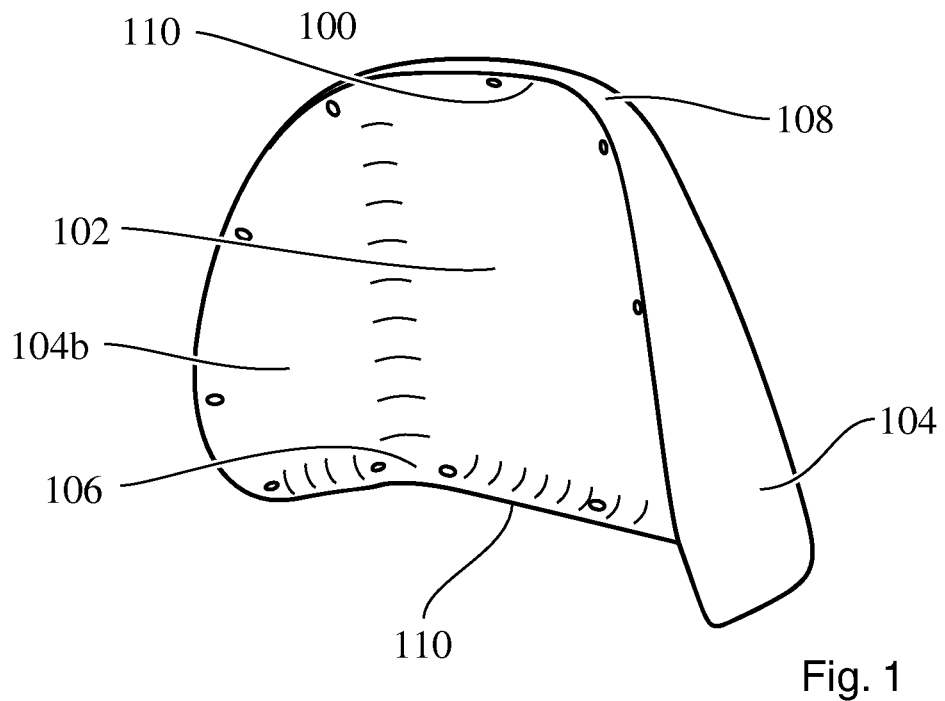
FIG. 1 is a perspective view showing the rear part with integrated side parts.

Referring to the drawings, FIG. 1 shows the rear part 100 with integrated side parts 104a and 104b of the head rest 400 according to the invention, with a view into the interior space which is defined by the rear side 102 and the integrated sides 104a and 104b. During the production process, the rear part 100 is formed by way of two distal deformations which point in the same direction, in such a way that a single structural part forms the rear side 102 and the two sides 104a and 104b of a head rest 400. A plastically deformable plastic may be suitable as production material for the rear part 100 according to the invention. On its rear side 102 and on its two sides 104a and 104b, the rear part 100 has edges 110 which are curved inward into the interior space and on which hooks 106 which face the interior space are situated. In one embodiment, the hooks 106 in each case have a tapering tip.

Figure 2:
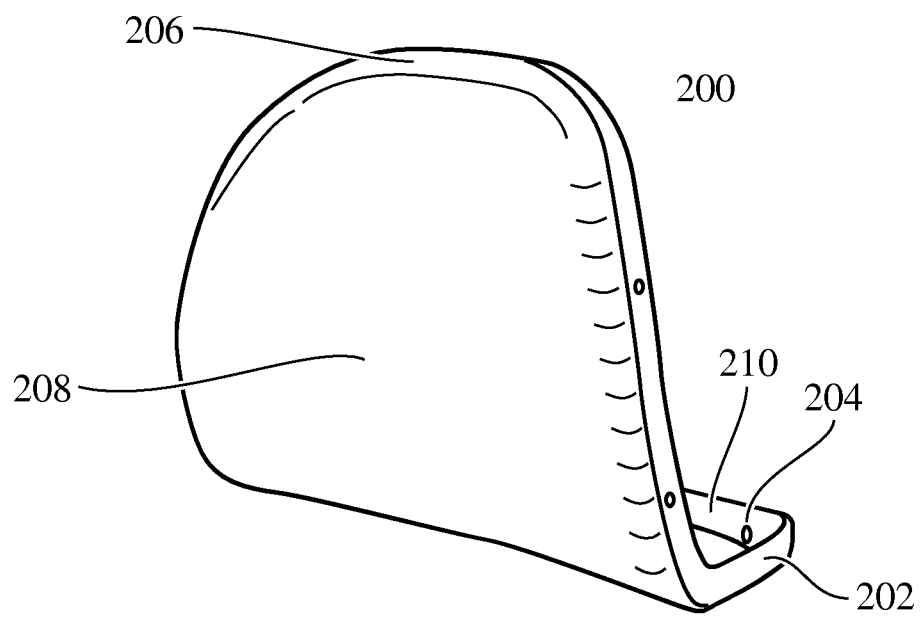
FIG. 2 is a perspective view showing the outer front side of the front part.

FIG. 2 shows the front part 200 of the head rest 400 according to the invention with a view of its outer front side 208. The outer front side 208 of the front part 200 has a concave inner curve, with the result that the lateral edges of the front side 208 are directed toward the front and the upper edge 206 is directed toward the rear. In said embodiment, the front part 200 is formed in such a way that the bottom 202 of the head rest 400 is also formed by the front part 200. The edges 210 of the front part 200 have first punched portions 204 which are configured to receive the hooks 106 of the rear part 100.

Figure 3:
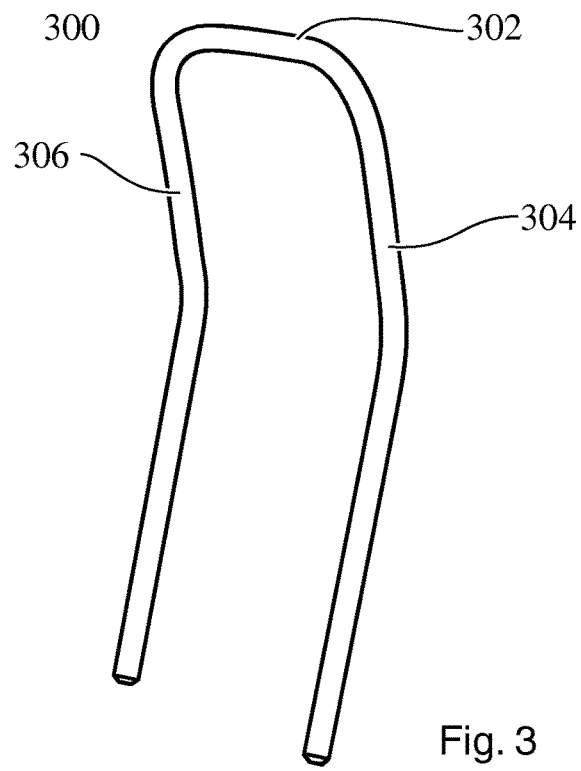
FIG. 3 is a perspective view showing a supporting rod which is curved in a U-shape.

FIG. 3 shows a supporting rod 300 which is curved in a U-shape and has two limbs 304 and 306 and a short section rod 302 which lies in between. Second punched portions 406 (shown in FIG. 6) are made on the limbs 304 and 306 and on the short section rod 302, which second punched portions 406 are configured to receive the hooks 106 of the rear part 100, in order thus to produce a fixed connection between the rear part and the supporting rod 300 which is curved in a U-shape.

Figure 4:
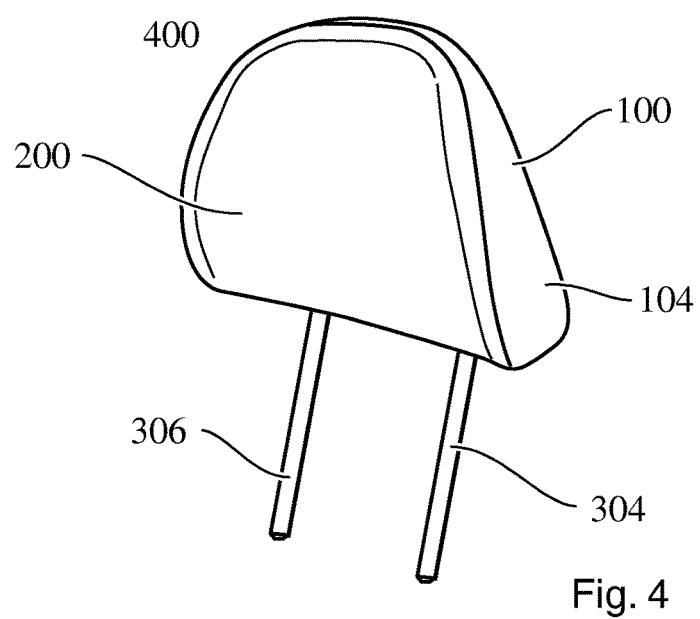
FIG. 4 is a perspective view showing the head rest according to the invention after assembly of the front part and the rear part.

FIG. 4 shows the head rest 400 according to the invention after the front part 200 and the rear part 100 and the supporting rod 300 which is curved in a U-shape are assembled together. The front part 200 and the rear part 100 are jammed with one another or into one another in a positively locking manner at the edges, the sides 104 of the head rest 400 being formed by the rear part 100. The limbs 304 and 306 of the supporting rod 300 which is curved in a U-shape protrude out of the space which is formed by the front part 200 and the rear part 100.

Figure 5:
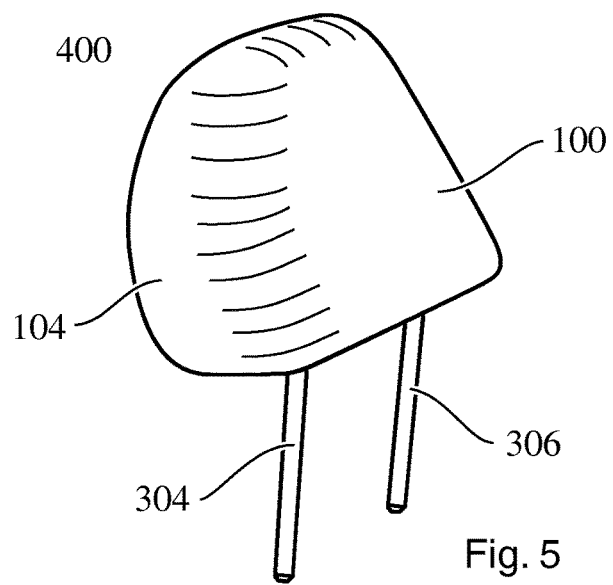
FIG. 5 is a perspective view showing the head rest rear part in the assembled state.

FIG. 5 shows the head rest 400 according to the invention with a view of the rear part 100 in the assembled state. The rear part 100 forms a hard shell in the rear region of the head rest 400, which hard shell comprises both the rear side 100 and the sides 104 of the head rest 400.

Figure 6:
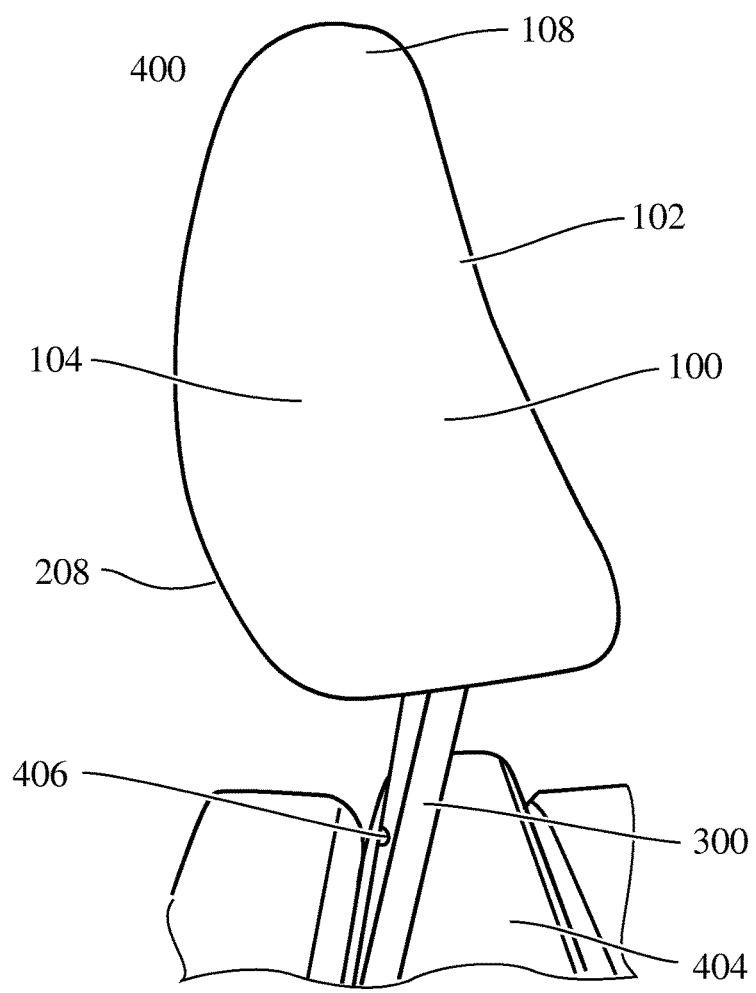
FIG. 6 is a view showing an original injection mold of the rear part.

FIG. 6 shows an original injection mold of the rear part 100 from the side, the rear part 100 being mounted on the supporting rod 300 which is curved in a U-shape. The supporting rod 300 which is curved in a U-shape is mounted onto the back rest 404 of a vehicle seat. Second punched portions 406 are made on the supporting rod 300 which is curved in a U-shape.

FIG. 7 shows the head rest 400 according to the invention which is assembled and is mounted onto the back rest 404 of a vehicle seat, with a plan view of the front side 208 of the front part 200. Here, the front side 208 of the front part 200 is formed by a tailored cover.

FIG. 8a shows an outer view from the side of a further embodiment of the head rest according to the invention. In the embodiment which is shown in FIG. 8, the front part 200 and the rear part 100 and, in particular, the bottom of the head rest have a characteristic form which is modified in comparison with those in the preceding figures. The supporting rod 300 likewise has different relative positioning in relation to the front part 200 and the rear part 100, the supporting rod 300 being arranged such that it is mounted dorsally to a more pronounced extent and running in parallel substantially in the immediate vicinity of the rear part 100. As a consequence, the supporting rod 300 does not necessarily have to be of U-shaped form in said embodiment.

FIG. 8b shows an enlarged outer and inner view from the side of said embodiment of the head rest according to the invention. A foam ("rigid foam"), for example polyurethane, is filled into the interior space which is formed by the front part 200 and the rear part 100, which foam replaces the inserts which are known in the prior art and are made from expanded polypropylene or plastic. As a result, the supporting rod 300 which does not necessarily have to be of U-shaped form can be fixed in the foam of the interior space with the application of a pour-in-place technique or with the application, for example, of an analogous through hole reflow technique ("pin-in-paste"). Moreover, padding which is otherwise customary can be replaced by a two-piece plastic part, consisting of a blank cut holder frame 404 and a rear covering 506, the blank cut holder frame 504 corresponding to the front part 200 and the rear covering 506 corresponding to the rear part 100.

The front part 200 comprises a tailored cover 502. The tailored cover 502 is fastened to the front part 200 merely by means of the hooks 106, without seams being required. The hooks 106 are formed from the front part 200 and can be of pin-like form. The front part 200 and/or the integrated hooks 106 can be formed in one piece from a thermoplastic. The rear part 100 can also be produced from a plastic. The feel and the comfort of the head rest can be optimized by way of a lamination which is integrated into the blank cut of the cover with the thermoplastic front part 200. Self-skinning is avoided as a result. The weight and the volume of the head rest can be reduced, without comfort and safety being forfeited. Esthetic requirements can also be met by way of the use of a cover for the front part 200 which is adapted to the cover of the remaining seat and, for example, a grained surface of the rear part 100.

While specific embodiments of the invention have been shown and described in detail to illustrate the application of the principles of the invention, it will be understood that the invention may be embodied otherwise without departing from such principles.

The invention claimed is:

1. A head rest for a vehicle, the head rest comprising:
    a front part;
    a rear part with integrated side parts, the front part and the rear part with integrated side parts being formed in a complementary manner such that, after assembly, the front part and the rear part together form a closed space, into which a supporting rod which is curved in a U-shape can be received; and
    foam, wherein the foam is filled into the closed space, the foam being a hard foam and/or a soft foam.

2. The head rest as claimed in claim 1, wherein the rear part with the integrated side parts has laterally inwardly inclined edges, on which hooks are attached which are configured for entering into a first plug connection with first punched portions which are made on the lateral edges of the front part, the inwardly inclined edges of the rear part with the integrated side parts enclosing the lateral edges of the front part in a positively locking manner, a part of the hooks being configured, furthermore, to enter into a second plug connection with second punched portions in the supporting rod which is curved in a U-shape.

3. The head rest as claimed in claim 2, wherein, along its respective axis, each of the hooks has a tapering tip which is configured to be received by the first punched portions and the second punched portions.

4. The head rest as claimed in claim 1, wherein the front part comprises a tailored trim part which comprises a cover.

5. The head rest as claimed in claim 1, wherein the rear part, with the integrated side parts, is an injection molded part, the injection molded part comprising a plastic.

6. The head rest as claimed in claim 1, wherein the front part and the rear part, with the integrated side parts, are free of seams.

7. The head rest as claimed in claim 1, wherein the supporting rod, which is curved in a U-shape, is arranged in the closed space between the front part and the rear part, with the integrated side parts, in such a way that a shortest rod section of the supporting rod, which is curved in a U-shape, runs largely parallel to an upper edge of the rear part, with the integrated side parts, and runs largely parallel to an upper edge of the front part.

8. A method for producing a head rest, the method comprising:
    assembling a front part, a rear part with integrated side parts, and a supporting rod which is curved in a U-shape together in one method step, wherein the front part and the rear part with the integrated side parts are joined together in a positively locking manner within a pour-in-place process, a closed space being produced, in which the supporting rod which is curved in a U-shape is positioned and is fastened to the upper edge of the rear part by a part of hooks, a foam is injected into the closed space, the rear part is an injection molded part which comprises a plastic, and an identical funnel is used for the production of the injection molded part and the injection of the foam.

\* \* \* \* \*